United States Patent [19]

Van Den Berg

[11] Patent Number: 4,810,363
[45] Date of Patent: Mar. 7, 1989

[54] PROCESS FOR THE CATALYTIC CONVERSION OF HYDROCARBON OILS

[75] Inventor: Franciscus G. A. Van Den Berg, Amsterdam, Netherlands

[73] Assignee: Shell Oil Company, Houston, Tex.

[21] Appl. No.: 141,180

[22] Filed: Jan. 6, 1988

[30] Foreign Application Priority Data

Jan. 27, 1987 [GB] United Kingdom ............... 8701740

[51] Int. Cl.$^4$ .............................................. C10G 45/04
[52] U.S. Cl. ......................... 208/251 H; 208/251 R; 208/216 PP; 208/254 H; 502/254; 502/255
[58] Field of Search ................... 208/251 H; 502/255

[56] References Cited

U.S. PATENT DOCUMENTS

| | | | |
|---|---|---|---|
| 4,102,779 | 7/1978 | Hensley, Jr. ............... | 208/251 H |
| 4,374,020 | 2/1983 | Trevino et al. ............. | 208/251 H |
| 4,381,993 | 5/1983 | Nevitt ....................... | 208/251 H |
| 4,520,128 | 5/1985 | Morales et al. ............. | 208/251 H |
| 4,537,875 | 8/1985 | Toulhault et al. ........... | 208/251 H |
| 4,648,963 | 3/1987 | Kutes et al. ................ | 208/251 H |

FOREIGN PATENT DOCUMENTS 0159097 10/1985 European Pat. Off. .

Primary Examiner—H. M. S. Sneed
Assistant Examiner—Helane Myers

[57] ABSTRACT

Hydrocarbon oils of which more than about 70% by volume boils above about 360° C. and which have a $C_5$-asphaltenes content of more than about 2.5% by weight are contacted at elevated temperature and pressure in the presence of hydrogen with a supported molybdenum containing catalyst, in which process hydrocarbon oils containing substantial amounts of nickel are converted at a pressure of at least about 80 bar, using a supported molybdenum containing catalyst having an average pore diameter in the range of about 30 to about 80 nm.

15 Claims, No Drawings

PROCESS FOR THE CATALYTIC CONVERSION OF HYDROCARBON OILS

FIELD OF THE INVENTION

The present invention relates to a process for the catalytic conversion of hydrocarbon oils by contacting the oils with a catalyst at elevated temperature and pressure in the presence of hydrogen.

BACKGROUND OF THE INVENTION

In the process of catalytically converting hydrocarbon oils into valuable lighter products, and in particular in the upgrading of residual hydrocarbon oils, the feedstocks to be used are normally subjected to one or more pre-treatments to substantially reduce the amount of metals and/or sulfur present therein. It is well known that metals and sulfur exert a detrimental effect on the life of catalysts used in conversion processes.

The use of catalysts comprising nickel and/or vanadium on porous carriers such as silica in demetallization processes is well established. Reference is made in this respect to Dutch Patent Specification No. 7309387.

It is known from U.S. Pat. No. 4,102,779 that heavy residual hydrocarbon oils having a high metal content can be demetallized using a Group VIB and/or a Group VIII catalyst. The product obtained has to be subjected to a desulfurization treatment using an appropriate catalyst prior to its use as feedstock in a cracking process.

It is further known from European Patent Specification No. 159097 that catalysts containing exclusively molybdenum in a quantity of more than 2 parts by weight per 100 parts by weight of silica can be used advantageously in the demetallization of heavy hydrocarbon oils having a relatively high $C_5$-asphaltenes content and a metal content (Ni+V) of less than 350 parts per million by weight (ppmw), in particular in the demetallization of feedstocks which have been obtained at least partly as a distillation residue of a distillation under reduced pressure of an atmospheric residue. At least part of the oils thus demetallized can be subjected to a further catalytic conversion process.

Hydrodemetallization catalysts as described hereinabove have been made and are generally utilized for the demetallization of vanadium-rich feedstock containing rather small amounts of nickel.

Nickel-rich feedstocks, however, are not demetallized satisfactorily with conventional demetallization catalysts due to their high nickel content so that the product obtained does not qualify as a suitable feed for further catalytic processing.

Therefore, it would be of importance to develop a process for the catalytic conversion of nickel-rich residual hydrocarbon oils based on catalysts which exert sufficient demetallization activity together with sufficient stability (long life-time).

It has now been found that nickel-rich hydrocarbon oils can be satisfactorily demetallized when use is made of certain catalysts operated at rather high hydrogen partial pressures.

SUMMARY OF THE INVENTION

The present invention relates to a process for the hydroconversion of metal-containing hydrocarbon oils wherein hydrocarbon oils of which more than about 70% by volume boils above about 360° C. and which have a $C_5$-asphaltenes content of more than about 2.5% by weight are contacted at elevated temperature and pressure in the presence of hydrogen with a supported molybdenum containing catalyst, in which process hydrocarbon oilscontaining substantial amounts of nickel are converted at a pressure of at least about 80 bar, using a supported molybdenum containing catalyst having an average pore diameter in the range of about to about 30–80 nm.

DESCRIPTON OF THE PREFERRED EMBODIMENTS

The hydroconversion process according to the present invention is applied to residual hydrocarbon oils containing substantial amounts of nickel, i.e. feedstocks which contain at least about 40 ppm nickel. Such feeds may also contain vanadium. The process according to the invention is suitably carried out using feedstocks having a Ni/V ratio of at least 1. Preferred feedstocks are hydrocarbon oils of which the Ni/V ratio is at most about 20 and in particular in the range about 2 to about 10.

Preferably, residual hydrocarbon oils of which more than about 40% by volume boils above about 520° C. are used as starting material. Preferred feedstocks are those which have been obtained at least partly as a distillation residue of a distillation under reduced pressure of an atmospheric residue. The $C_5$-asphaltenes content of the residual hydrocarbon oils to be used as starting material is preferably more than about 10% weight, in particular between about 15% by weight and about 25% by weight.

The catalysts that can be used in the process according to the present invention contain molybdenum as a metal with hydrogenation activity, preferably molybdenum in a quantity of more than about 0.5 parts by weight per 100 parts by weight of silica and have an average pore diameter between about 30 and about 80 mm. Preferably, the amount of molybdenum is not more than about 15 parts by weight per 100 parts by weight of silica. Excellent results have been obtained using molybdenum in an amount between about 2.0 and about 12.0, in particular between about 4 and about 8 parts by weight per 100 parts by weight of silica.

Optionally, a catalyst can be used comprising in addition to molybdenum a further metal or metal compound such as nickel, cobalt, vanadium and tungsten. Phosphorus or a phosphorus compound may also be present.

Molybdenum may be present on the carrier in metallic form or in oxidic or sulfide form as may be the other metals mentioned hereinabove.

The preparation of the catalysts to be used in the present process is preferably carried out by impregnating a porous carrier with an aqueous solution containing one or more molybdenum compounds, followed by drying and calcining the composition thus obtained. Special preference is given to the preparation of suitable catalysts by the "dry" impregnation technique, in which the porous carrier (e.g. silica) is contacted with a quantity of impregnation liquid, the volume of which mainly corresponds with the pore volume of the carrier, followed by drying and calcining the composition obtained.

Silica particles which can be used suitably as carrier for the catalysts to be used in the process according to the present invention can be prepared by spray-drying of a silica gel followed by extrusion of the spray-dried mico particles to form larger particles. Also, substantially spherical silica particles obtained by means of the known oil drop method can be used advantageously. In the latter method a silica hydrosol is formed, the hydrosol is combined with a gelation agent and the mixture is dispersed as drops in an oil until they have solidified to spherical hydrogel particles which are subsequently separated off, washed, dried and calcined. The present catalysts or catalyst carriers can inter alia be formed by extrusion or tabletting. In addition to these shaping techniques, especially the known nodulizing technique is a very attractive shaping method, for the present catalysts or catalyst carriers. By this method catalyst particles having a diameter of at most about 0.1 mm are agglomerated to particles with a diameter of at least about 1 mm by means of a granulation liquid. The catalysts to be used in the process according to the present invention normally have an average particles diameter between about 0.5 and about 5 mm, in particular between about 0.5 and about 2.5 mm. The average pore diameter of the catalyst particles to be applied is in the range between about 30 and about 80 nm, preferably between about 35 and about 50 nm. Such catalysts are referred to as "wide pore" catalysts.

The complete pore diameter distribution of a catalyst can be determined by means of the nitrogen adsorption/desorption method (as described by E. V. Ballou and O. K. Doolen in Analytic Chemistry 32, 532 (1960) in combination with the mercury penetration method (as described by H. L. Ritter and L. C. Drake in Industrial and Engineering Chemistry, Analytical Edition 17, 787 (1945)), using mercury pressures of 1–2000 bar. The pore diameter distribution of a catalyst in the pore diameter range of 7.5 nm and below is calculated with reference to the nitrogen desorption isotherm (assuming cylindrical pores) by the method described by J. C. P. Broekhoff and J. H. de Boer in *Journal of Catalysis*, 10, 377 (1968) and the pore diameter distribution of a catalyst in the pore diameter range above 7.5 nm is calculated by means of the formula $$\text{pore diameter (in nm)} = \frac{15{,}000}{\text{absolute mercury pressure (in bar)}}$$

The total pore volume of a catalyst is the sum of the nitrogen pore volume present in pores with a diameter of 7.5 nm and below (determined by means of the above-mentioned nitrogen adsorption/desorption method and the mercury penetration method).

After a complete pore diameter distribution of a catalyst sample has been determined, the pore diameter is read from a graph in which for the pore diameter range of from 0 to 100 nm for each successive pore volume increment that is present in pores with an equal diameter interval smaller than or equal to 2 nm, and which pore volume increment is smaller than or equal to 10% of the pore volume, the quotient of the pore volume increment and the corresponding pore diameter interval has been cumulatively plotted as a function of the linear average pore diameter over the relevant pore diameter interval; the average pore diameter is the pore diameter corresponding to 50% of the total quotient.

The average particle diameter can be determined as follows. After a complete sieve analysis of a representative catalyst sample, using the set of standard sieves described in the 1969 Book of ASTM Standards, Part 30, pp. 96-101 (ASTM Designation: E 11-61), has been carried out, the average particle diameter is read from a graph in which for each successive sieve fraction the percentage by weight, based on the total weight of the catalyst sample, has been cumulatively plotted as a function of the linear average particle diameter of the relevant sieve fraction; the average particle diameter is the particle diameter corresponding to 50% of the total weight.

The process according to the present invention is suitably carried out by passing the heavy hydrocarbon oil to be converted at elevated temperature and pressure in the presence of hydrogen, in upward, downward or radial direction through one or more vertically arranged reactors containing a fixed or moving bed of the appropriate catalyst particles. If described, the process can also be carried out by suspending the catalyst in the hydrocarbon oil to be converted. The process according to the present invention is suitably carried out at a temperature of about 300° to about 475° C., a hydrogen partial pressure of up to about 300 bar and a space velocity of about 0.05 to about 10 kg/l/h. Preferably the process according to the present invention is carried out at a temperature between about 350° C. and about 450° C., a hydrogen partial pressure of up to 250 bar and a space velocity of about 0.1–7.5 kg/l/h.

Part of all the product obtained by the hydroconversion process according to the present invention may be subjected to further catalytic processes, in particular to catalytic processes to obtain light hydrocarbon oils.

The process according to the present invention is preferably carried out in bunker flow operation, i.e. in reactors which ensure mass flow of the catalyst particles and which are designed in such a way that periodically or continually catalyst particles can be withdrawn from the bottom of the reactor while fresh catalyst particles can be introduced in the upper part of the reactor. Normally such reactors contain one or more catalyst beds resting on conical supports and having a central catalyst outlet duct provided with screens to separate liquid and gaseous effluent from the catalyst particles. The process according to the present invention can also be carried out suitably in a number of reactors in series, one of them may be temporarily off-stream to replenish the catalyst load.

The invention will now be illustrated with references to the following Example which is not to be construed as limiting the scope of the invention.

EXAMPLE

Experiments were carried out using three different catalysts (A, B and C) for the hydroconversion of a nickel-rich short residue obtained by distillation under reduced pressure of an atmospheric distillation residue of a crude oil.

The properties of the catalysts applied are given in Table I. Catalyst A (a conventional nickel/vanadium on silica catalyst) and Catalyst B (a narrow-pore molybdenum on silica catalyst) were used as comparative catalysts. Catalyst C (a wide-pore molybdenum on silica catalyst) is a catalyst according to the invention. The catalysts B and C were prepared by impregnating a silica carrier with a solution of ammonium dimolybdate in 25% wt ammonia. The resulting mixture was stirred for one hour and thereafter dried at 120° C. for one hour followed by calcination at 450° C. for one hour.

TABLE I

| Catalyst | Metal(s)* % w | Pore Volume ml/g | Average Pore diameter nm | Average particle diameter mm |
|---|---|---|---|---|
| A | Ni:0.48 + V:1.92 | 0.87 | 59 | 1.5 |
| B | Mo:5.0 | 0.9 | 25 | 2.3 |
| C | Mo:5.0 | 0.9 | 40 | 2.3 |

*basis 100% silica carrier

The heavy residual hydrocarbon oil of which 72.4% by volume boiled above 520° C. and which contained 5.85% wt of sulfur and 111 ppm nickel and 11 ppm vanadium and which has a $C_5$-asphaltenes content of 20.6% wt and a RCR of 23% wt was passed together with hydrogen in downward direction through a vertically arranged cylindrical reactor containing a fixed bed of the appropriate catalyst with a maximum allowable temperature of 415° C. for a constant metal removal of 70%, and hydrogen partial pressure of 120 bar at a space velocity of 0.3 kg/l/h and a gas flow rate of 1000 N(S.T.P.)/kg.

The results expressed as relative process run lengths based on a constant metal removal of 70% are given in Table II.

TABLE II

| | catalyst | | |
|---|---|---|---|
| | A | B | C |
| run length | 0.6 | 1 | 1.5 |

It will be clear from the results given in Table II that metal-containing hydrocarbon oils containing substantial amounts of nickel can be converted advantageously using the process according to the present invention compared with the performances of demetallization catalysts A and B.

I claim:

1. A process for the hydrodemetallization of a metal-containing hydrocarbon oil containing substantial amounts of nickel which process comprises contacting said hydrocarbon oil having more than about 70% by volume boiling above about 360° C. and a $C_5$-asphaltenes content of more than about 2.5% by weight at elevated temperature and pressure in the presence of hydrogen with a silica supported molybdenum containing catalyst having an average pore diameter in the range of from about 35 nm to about 50 nm.

2. The process of claim 1 wherein said hydrocarbon oil has a Ni/V ratio of at least 1.

3. The process of claim 2 wherein said hydrocarbon oil has a Ni/V ratio of at most about 20.

4. The process of claim 1 wherein said hydrocarbon oil contains at least about 40 ppm nickel.

5. The process of claim 1 wherein more than about 40% by volume of said hydrocarbon oil boils above 520° C.

6. The process of claim 1 wherein said hydrocarbon oil has been obtained at least partly as a distillation residue of a distillation under reduced pressure of an atmospheric residue.

7. The process of claim 1 wherein said hydrocarbon oil has a $C_5$-asphaltenes content of more than about 10% by weight.

8. The process of claim 1 wherein said catalyst comprises more than about 0.5 parts by weight of molybdenum per 100 parts by weight of silica.

9. The process of claim 8 wherein said catalyst containing not more than about 15 parts by weight of molybdenum per 100 parts by weight of silica.

10. The process of claim 9 wherein said catalyst contains about 2.5 to about 12.5 parts by weight of molybdenum per 100 parts by weight of silica.

11. The process of claim 10 wherein said catalyst contains about 2.5 to about 10 parts by weight of molybdenum per 100 parts by weight of silica.

12. The process of claim 1 wherein said catalyst additionally contains a metal or metal compound selected from the group consisting of nickel, cobalt, vanadium and tungsten.

13. The process of claim 12 wherein said catalyst additionally contains phosphorus, a phosphorus compound or mixtures thereof.

14. The process of claim 1 wherein molybdenum is present as sulfide in the catalyst.

15. The process of claim 1 wherein said process is carried out at a temperature between about 350° C. and about 450° C., a hydrogen partial pressure of up to about 250 bar and a space velocity between about 0.1 and about 7.5 kg/l/h.

* * * * *